（12）United States Patent
Pogmore

(10) Patent No.: US 10,061,862 B2
(45) Date of Patent: Aug. 28, 2018

(54) COMPACT TREE NODE REPRESENTATION OF AN XML DOCUMENT

(75) Inventor: George R. Pogmore, Greenwood Village, CO (US)

(73) Assignee: Oracle International Corporation, Redwod Shores, CA (US)

( * ) Notice: Subject to any disclaimer, the term of this patent is extended or adjusted under 35 U.S.C. 154(b) by 633 days.

(21) Appl. No.: 13/459,901

(22) Filed: Apr. 30, 2012

(65) Prior Publication Data

US 2013/0086127 A1  Apr. 4, 2013

Related U.S. Application Data

(60) Provisional application No. 61/542,181, filed on Oct. 1, 2011.

(51) Int. Cl.
*G06F 7/00* (2006.01)
*G06F 17/30* (2006.01)
(Continued)

(52) U.S. Cl.
CPC ...... *G06F 17/30911* (2013.01); *H04L 9/0869* (2013.01)

(58) Field of Classification Search
CPC .......... G06F 17/2247; G06F 17/30595; G06F 17/2205; G06F 17/30923; G06F 17/30327; G06F 17/30625; G06F 17/30911; G06F 17/227; G06F 17/30; G06F 17/2241; G06F 17/30091; G06F 17/30705; G06F 17/3071; G06F 17/30961; G06F 17/30997; G06F 17/24; G06F 17/30893; G06F 7/00; G06F 17/30017; G06F 17/30286;
(Continued)

(56) References Cited

U.S. PATENT DOCUMENTS 4,864,615 A  9/1989  Bennett et al.
5,225,833 A  7/1993  Fisher et al.
(Continued)

OTHER PUBLICATIONS

Advisory Action dated Jan. 14, 2014 for U.S. Appl. No. 13/459,829.
(Continued)

*Primary Examiner* — Syling Yen
*Assistant Examiner* — Cecile Vo
(74) *Attorney, Agent, or Firm* — Vista IP Law Group, LLP

(57) ABSTRACT

Methods and systems for creating a compact tree node representation of an XML document. One implementation commences by allocating memory for storing an XML tree index data structure, then allocating another separate portion of memory to store a hash table. Then, traversing an XML document to process the traversed nodes as follows: (a) when the traversed node is an element node, then adding the element node to the XML tree index data structure (b) when the traversed node is a text node, then populating a text node index into the XML tree index data structure and copying the text node values to the hash table, and (c) when the traversed node is an attribute node, then populating an attribute node index into the XML tree index data structure. Such a structure supports fast index-based tree restructuring, and permits very large XML document to be accessed within tight memory size constraints.

21 Claims, 13 Drawing Sheets

(51) Int. Cl.
*H04L 9/08* (2006.01)
*G06F 13/14* (2006.01)

(58) Field of Classification Search
CPC ......... G06F 17/30289; G06F 17/30321; G06F 17/30392; G06F 17/30539; G06F 17/30604; G06F 17/30607
USPC ....... 707/706, 716–719, 741, 747, 765, 759, 707/693, 778, 830, 999.003, 999.1, 707/E17.127, 797, 803, 956, E17.012, 707/999.102, E17.087, 791, 793, 953, 707/E17.052, E17.117, 796, 802, 999.001, 707/E17.045, 786, 999.107
See application file for complete search history.

(56) References Cited

U.S. PATENT DOCUMENTS

| | | | |
|---|---|---|---|
| 5,696,504 A | 12/1997 | Oliveros | |
| 5,742,686 A | 4/1998 | Finley | |
| 6,717,580 B1 | 4/2004 | Tang | |
| 6,744,761 B1 | 6/2004 | Neumann et al. | |
| 7,003,532 B2* | 2/2006 | Bradshaw | G06F 17/30008 707/648 |
| 7,647,552 B2* | 1/2010 | Wan | H04L 29/06 709/203 |
| 8,229,932 B2* | 7/2012 | Krishnamurthy | G06F 17/30917 707/741 |
| 2002/0087596 A1* | 7/2002 | Lewontin | G06F 17/30896 715/234 |
| 2003/0210787 A1 | 11/2003 | Billhartz et al. | |
| 2005/0021923 A1* | 1/2005 | Von Bergen | G06F 12/023 711/171 |
| 2005/0055343 A1* | 3/2005 | Krishnamurthy | G06F 17/3061 |
| 2005/0160108 A1* | 7/2005 | Charlet | G06F 17/30595 |
| 2006/0092867 A1 | 5/2006 | Muller et al. | |
| 2007/0204290 A1 | 8/2007 | Li | |
| 2007/0239769 A1* | 10/2007 | Fazal | G06F 17/30554 |
| 2008/0301646 A1* | 12/2008 | Gupta | G06F 11/366 717/127 |
| 2009/0052661 A1 | 2/2009 | Fahrny et al. | |
| 2010/0142710 A1 | 6/2010 | Chrysler et al. | |
| 2012/0230225 A1 | 9/2012 | Matthews et al. | |
| 2013/0086127 A1 | 4/2013 | Pogmore | |
| 2013/0086392 A1 | 4/2013 | Pogmore | |
| 2013/0086393 A1 | 4/2013 | Pogmore | |

OTHER PUBLICATIONS

Non-final Office Action dated Feb. 28, 2014 for U.S. Appl. No. 13/459,829.
Notice of Allowance and Fees Due dated Jun. 6, 2014, for U.S. Appl. No. 13/459,744.
Notice of Allowance and Fees Due dated Jul. 8, 2014, for U.S. Appl. No. 13/459,829.
Final Office Action dated Nov. 8, 2013 for U.S. Appl. No. 13/459,829.
Non-final Office Action dated Jul. 26, 2013 for U.S. Appl. No. 13/459,829.

* cited by examiner

XML Tree Index
Data Structure $202_5$

| Node | Memory Block Index | Array Offset |
|---|---|---|
| E1 | MB1 | E1offset |
| E2 | MB1 | E2offset |
| E3 | MB4 | E3offset |
| | | |

XML Tree Index
Data Structure $202_6$

| Node | Memory Block Index | Array Offset |
|---|---|---|
| T1 | MB2 | T1offset |
| T2 | MB2 | T2offset |
| T3 | MB2 | T3offset |
| | | |

XML Tree Index
Data Structure $202_7$

| Node | Memory Block Index | Array Offset |
|---|---|---|
| A1 | MB3 | A1offset |
| A2 | MB3 | A2offset |
| A3 | MB3 | A3offset |
| | | |

XML Tree Index
Data Structure $202_8$

| Node Index | Type (4 bits) | Memory Block Index (12 bits) | Array Offset (16 bits) |
|---|---|---|---|
| E1 | 0000 | MB1 | E1offset |
| E2 | 0000 | MB1 | E2offset |
| E3 | 0000 | MB4 | E3offset |
| T1 | 0001 | MB2 | T1offset |
| A1 | 0010 | MB3 | A1offset |

FIG. 4B

COMPACT TREE NODE REPRESENTATION OF AN XML DOCUMENT

RELATED APPLICATIONS

The present application claims the benefit of priority to U.S. Provisional Patent Application Ser. No. 61/542,181, filed Oct. 1, 2011, entitled "DATA STRUCTURE REPRESENTATION, MEANING AND PASSING" which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of managing XML documents and more particularly to techniques for creating a compact tree node representation of an XML document.

BACKGROUND

Embodiments of the present disclosure are directed to an improved approach for creating a compact tree node representation of an XML document.

In various use cases, legacy representation of data structures within enterprise data processing applications is inconvenient, and in some cases unwieldy. For example, in storing and accessing an XML document, it is known that when using (legacy) DOM processing implementations to access an XML document, the entire DOM data structure must be stored in memory. For some data processing applications, especially those involving kernel processing, the DOM processing runs out of memory and crashes when generating a large volume of data (e.g., a large number of invoices). One legacy approach has been to split the processing into several jobs, each with a smaller amount of data (e.g., a smaller number of invoices). However, this technique is often inconvenient to employ, and moreover this technique does not work well in situations where it is a priori unknown how to split the processing into smaller amounts of data.

The aforementioned legacy technologies do not have the capabilities to create a compact tree node representation of an XML document that can be accessed portion by portion without requiring that the entire XML document to reside in memory. And, further, what is needed is a new method that uses significantly less memory compared to DOM—even when loading a complete XML document into memory. Therefore, there is a need for an improved approach for creating and using compact tree node representations of an XML document.

SUMMARY

The present disclosure provides an improved method, system, and computer program product suited to address the aforementioned issues with legacy approaches. More specifically, the present disclosure provides a detailed description of techniques used in methods, systems, and computer program products for creating a compact tree node representation of an XML document.

Disclosed herein are methods, systems and a computer program product for creating a compact tree node representation of an XML document. The disclosed techniques permit a compact, index-based representation of the nodes of a very large XML document to be loaded into memory, while keeping the contents of the XML document nodes in one or more separate data structures that can be accessed as needed. In some cases the entire XML document (in its compact representation) is loaded into memory and, by manipulating only indexes, the XML tree can be restructured. In situations where the contents of the XML document nodes are needed for processing (e.g., the aforementioned restructuring), the contents can be accessed using paging memory such that the contents of the XML document that is being processed can be loaded into memory, and the contents of the XML document that have been processed (or otherwise not needed in memory) can be paged out to external storage.

One implementation commences by allocating memory for storing an XML tree index data structure, allocating another separate portion of memory to store one or more hash tables, then traversing an XML document to process the traversed nodes as follows: (a) when the traversed node is an element node, then adding the element node to the XML tree index data structure; (b) when the traversed node is a text node, then populating a text node index into the XML tree index data structure and copying the text node values to a hash table; and (c) when the traversed node is an attribute node, then populating an attribute node index into the XML tree index data structure and copying the attribute node values and attribute node name to a hash table. Noncontiguous memory blocks can be used to hold the contents of the hash tables, and the memory blocks can be paged into memory or paged out of memory as needed.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 4A is a schematic of a component of an XML tree index structure, according to some embodiments.

FIG. 4B is an array-oriented schematic of an XML tree index structure used in a compact tree node representation of an XML document, according to some embodiments.

DETAILED DESCRIPTION

Some embodiments of the present disclosure are directed to an improved approach for implementing compact tree node representation of an XML document. More particularly, disclosed herein are environments, methods, and systems for creating and using compact tree node representations of an XML document.

Overview

For various use cases of data structure representation, meaning and passing within enterprise data processing applications, legacy representation of the data is inconvenient, and in some cases unwieldy. For example, in DOM access, an XML data structure must be stored in memory (i.e., typically, DOM XML processing is used only when the XML data structure can be in memory). For some data processing applications involving kernel processing, the DOM processing runs out of memory and crashes when generating a large volume of data (e.g., a large number of invoices). One legacy approach has been to split the processing into several jobs, each with a smaller amount of data (e.g., a smaller number of invoices). However, the job-splitting technique is often inconvenient to employ, and moreover this technique does not work well in situations where it is a priori unknown how to split the jobs in order to use smaller amounts of data in memory.

One feature of the compact tree node representation of an XML document in accordance with the disclosed embodiments is that the compact tree nodes can represent a huge XML tree, i.e., and can represent a huge amount of XML relationships in memory compared to using DOM processing. The compact tree node representation as disclosed herein addresses the following:

The compact tree node representation consumes much less memory as compared to the aforementioned legacy DOM implementations;

The aforementioned legacy DOM implementations require the entire XML tree to be read into memory at one time, thus limiting the practical size of an XML tree to be processed;

The compact tree node representation can take advantage of discrete memory allocations and does not require contiguous memory allocations. Implementations of the compact tree node representation allocates memory in memory blocks (e.g., in discrete allocations of 64K byte arrays). If the XML tree is larger than available memory, then using the herein disclosed compact tree node representation, memory blocks can be easily paged to and from external storage (such as a disk drive).

Descriptions of Exemplary Embodiments

Figure 1A:
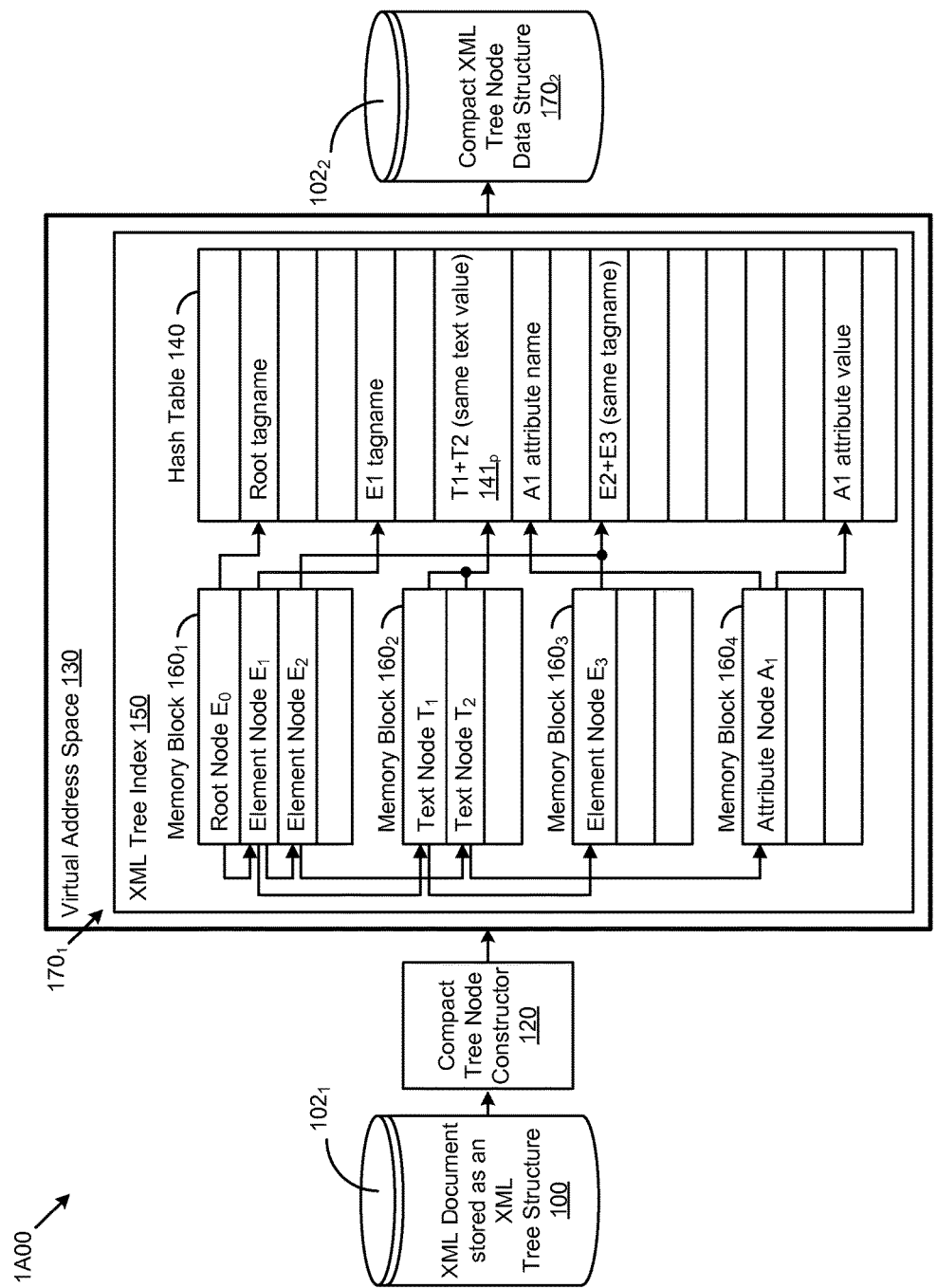
FIG. 1A is a system for creating a compact tree node representation of an XML document, according to some embodiments.

FIG. 1A is a system 1A00 for creating a compact tree node representation of an XML document. As an option, the present system 1A00 may be implemented in the context of the architecture and functionality of the embodiments described herein. Also, the system 1A00 or any aspect therein may be implemented in any desired environment.

FIG. 1A shows an XML tree structure 100 transformed into compact XML tree node data structures 170. The virtual address space 130 comprises an in-memory instance of a compact XML tree node data structure (e.g., compact XML tree node data structure $170_1$), only a portion of which compact XML tree node data structures 170 needs to be in memory at any moment in time; other portions can be paged-out (e.g., see compact XML tree node data structure $170_2$).

In some embodiments an XML tree structure 100 comprises various types of nodes (e.g., element nodes, attribute nodes, and text nodes). Each node in the XML tree structure can be transformed into data values within the compact XML tree node data structures 170. For example, each node in the XML tree structure can be transformed so as to be represented by an address or pointer (e.g., an index value, a hash value) that can refer to a further structure (e.g., a memory block 160, a hash table 140, etc.). In some cases, a given node in the compact XML tree node data structure 170 can be (at least partially) represented by an index into a memory block, or by a pointer in the form of a hash value, which hash value in turn refers to a hash bin (e.g., hash bin $141P$, etc.) in a hash table 140. It is possible that each type of node in the XML tree can be represented by a different structure, which structure is defined based on the characteristics of the node type to be stored. Some examples are discussed below.

One possible flow in accordance with the embodiment of FIG. 1A begins with an XML document being stored in a persistent storage device (e.g., a disk drive, etc.). Such an XML document might have been written to the persistent storage device $102_1$ by a report generator or other enterprise software application. In some cases, such an XML document can become voluminous, and in some cases much larger than the main memory of a computer, thus precipitating the need for the herein-disclosed techniques.

Continuing discussion of the system 1A00, an XML tree structure 100 can be read by a compact tree node constructor 120, and the compact tree node constructor can output a compact tree node representation as depicted in the form of an XML tree index 150 and a hash table 140 (as shown within the virtual address space 130).

While constructing the XML tree index 150, the compact tree node constructor 120 can populate the XML tree index 150 with the minimum amounts of data needed to uniquely identify a particular node. In some cases, the contents (e.g., text, attributes, etc.) of the node can be stored in other structures. For example, any given memory block (e.g., memory block $160_1$, memory block $160_2$, memory block $160_3$, memory block $160_4$, etc.) included an XML tree index 150 might be populated with only element nodes, or only text nodes, or only attribute nodes, or only other types of nodes as may be present.

As can be understood, using such an organization, the XML data tree structure can represent a large XML tree, yet requires only a minimal portion of the XML data tree structure to be present in main memory at any moment in time. In exemplary embodiments, as the compact tree node constructor processes an XML tree, portions of the XML tree index 150 and portions of the hash table 140 can be written to a persistent storage device 102$_2$ in the form of a compact XML tree node data structure 170.

The embodiment of FIG. 1A supports the range of XML node types, namely element nodes, attribute nodes, and text nodes. As shown, an element node is designated as "E<n>" where <n> is a numeric value, a text node is designated as "T<n>" where <n> is a numeric value, and an attribute node is designated as "A<n>" where <n> is a numeric value. Additional types can be readily added without departing from the scope of the disclosure.

In some situations, a tree node may have multiple child nodes, and more particularly, a tree node may have multiple child text nodes. One possible approach for compact storage is to store the multiple text nodes in the same hash bin, and use an offset value to refer to a particular offset location within the given hash bin. As shown, even though the text node T1 and the text node T2 both refer to the same hash bin 141$_P$, each text node T1 or T2 can be individually addressed using the combination of the hash bin address and a corresponding offset value.

Figure 1B:
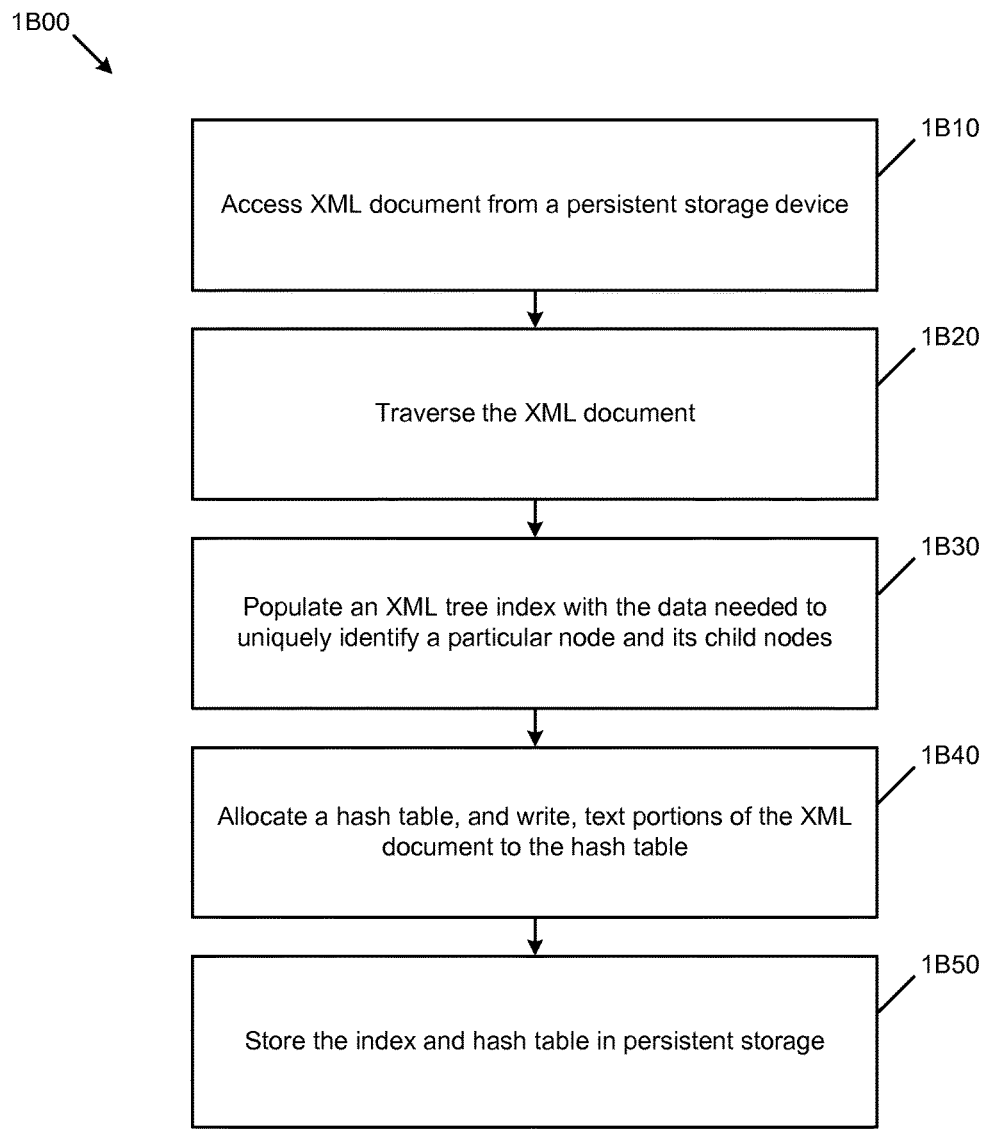
FIG. 1B is a flowchart for constructing a compact tree node representation of an XML document, according to some embodiments.

FIG. 1B is a flowchart 1B00 for constructing a compact tree node representation of an XML document such as is given in FIG. 1A. As an option, the present flowchart 1B00 may be implemented in the context of the architecture and functionality of the embodiments described herein. Also, the flowchart 1B00 or any aspect therein may be implemented in any desired environment.

The flow of flowchart 1B00 commences by accessing an XML document from a persistent storage device such as persistent storage device 102$_1$ (see operation 1B10). In some cases, the accessed XML document is sufficiently small that it can be accessed via a standard implementation of a data object model (DOM) and held in its entirety in memory (see FIG. 2A). Or, the accessed XML document is sufficiently large that it can advantageously be accessed using a streaming technique (e.g., SAX) in order to traverse the XML document (see operation 1B20). Then, an XML tree index can be constructed node-by-node as the XML document is traversed, and during the course of node-by-node construction, an XML tree index is populated with (at least) the data needed to uniquely identify a particular node. In exemplary cases, a node has children nodes, and the index(es) of the child nodes can be back-annotated into the parent node (see operation 1B30). Further, a node can comprise data. For example, a text node can comprise any amount of text, and attribute node can comprise any extent of attributes and attribute values, etc. The text of a text node, and/or the attributes of an attribute node, etc. can be stored in a hash table. Accordingly the flow of flowchart 1B00 allocates a hash table, and stores text portions of the XML document into hash bins within the hash table (see operation 1B40). At any point in time, some (or all) of the index and/or some (or all) of the hash table can be written to persistent storage (see operation 1B50) and construction can continue.

Figure 1C:
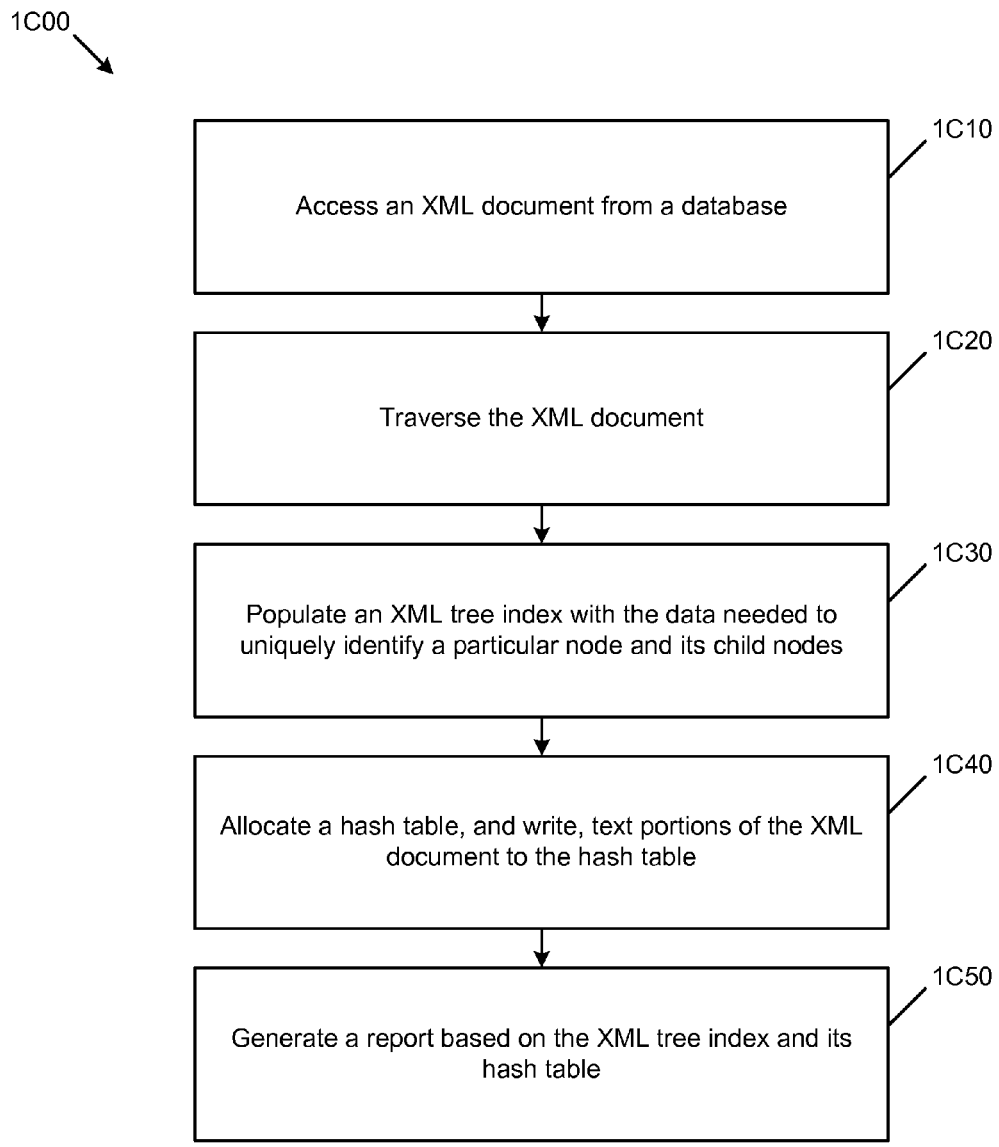
FIG. 1C is a flowchart for generating a report based on a compact tree node representation of an XML document, according to some embodiments.

FIG. 1C is a flowchart for generating a report based on a compact tree node representation of an XML document As an option, the present flowchart 1C00 may be implemented in the context of the architecture and functionality of the embodiments described herein. Also, the flowchart 1C00 or any aspect therein may be implemented in any desired environment.

The flow of flowchart 1C00 commences by accessing an XML document from a database (see operation 1C10) and the XML document is traversed using database retrieval techniques in order to process the XML document (see operation 1C20). An XML tree index can be constructed node-by-node as the XML document is traversed, and during the course of node-by-node construction, an XML tree index is populated with (at least) the data needed to uniquely identify a particular node. In exemplary cases, a node has children nodes, and the index(es) of the child nodes can be back-annotated into the parent node (see operation 1C30). The flow of flowchart 1C00 allocates a hash table, and stores text portions of the XML document into hash bins within the hash table (see operation 1C40). At any point in time, some (or all) of the index and/or some (or all) of the hash table can be accessed by a report generator (see operation 1050) and a report can be output in any known form (e.g., stored to a database, passed to a print queue, etc.).

Figure 2A:
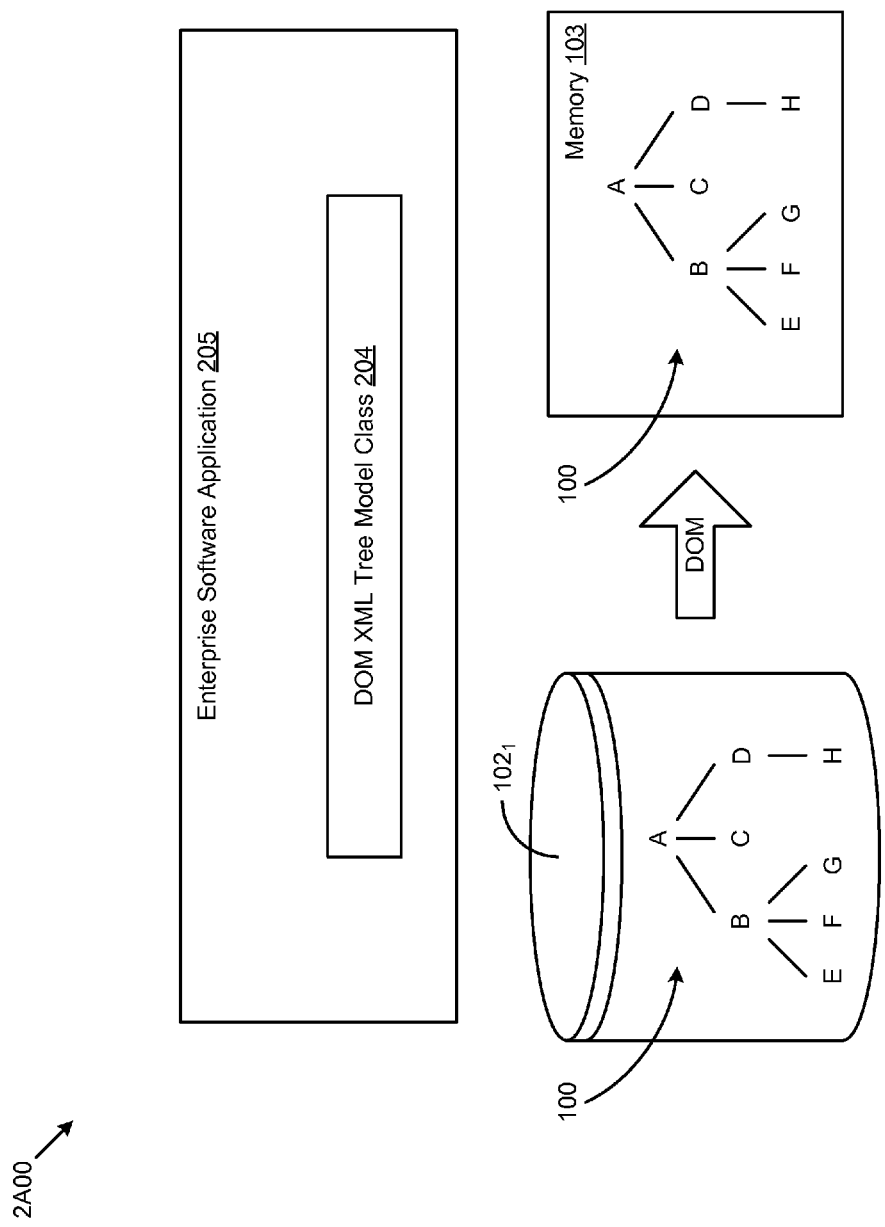
FIG. 2A depicts an enterprise software application within a system using a DOM XML tree model class for processing an XML document, according to some embodiments.

FIG. 2A depicts an enterprise software application within a system 2A00 using a DOM XML tree model class for processing an XML document. As an option, the present system 2A00 may be implemented in the context of the architecture and functionality of the embodiments described herein. Also, the system 2A00 or any aspect therein may be implemented in any desired environment.

As shown, an XML tree structure 100 is stored in persistent storage device 102$_1$, and is accessed by an enterprise software application 205 using a DOM XML tree model class 204. As earlier described, the legacy DOM XML tree model suffers from main memory size/usage requirements that are directly proportional to the size of the XML tree structure 100. That is, a disk-resident instance of an XML tree structure 100 having elements {A, B, C, D, E, F, G and H} is brought into memory 103 via the DOM (as shown) in the form of a memory-resident instance of an XML tree structure 100 having elements {A, B, C, D, E, F, G and H}. As the size of the XML tree structure 100 grows, so do the memory requirements.

The DOM memory-requirement problem (and other DOM problems) can be ameliorated by using an index or other advantageously-defined structure. And some embodiments of this disclosure implement techniques for creating and using an XML tree index data structure.

Figure 2B:
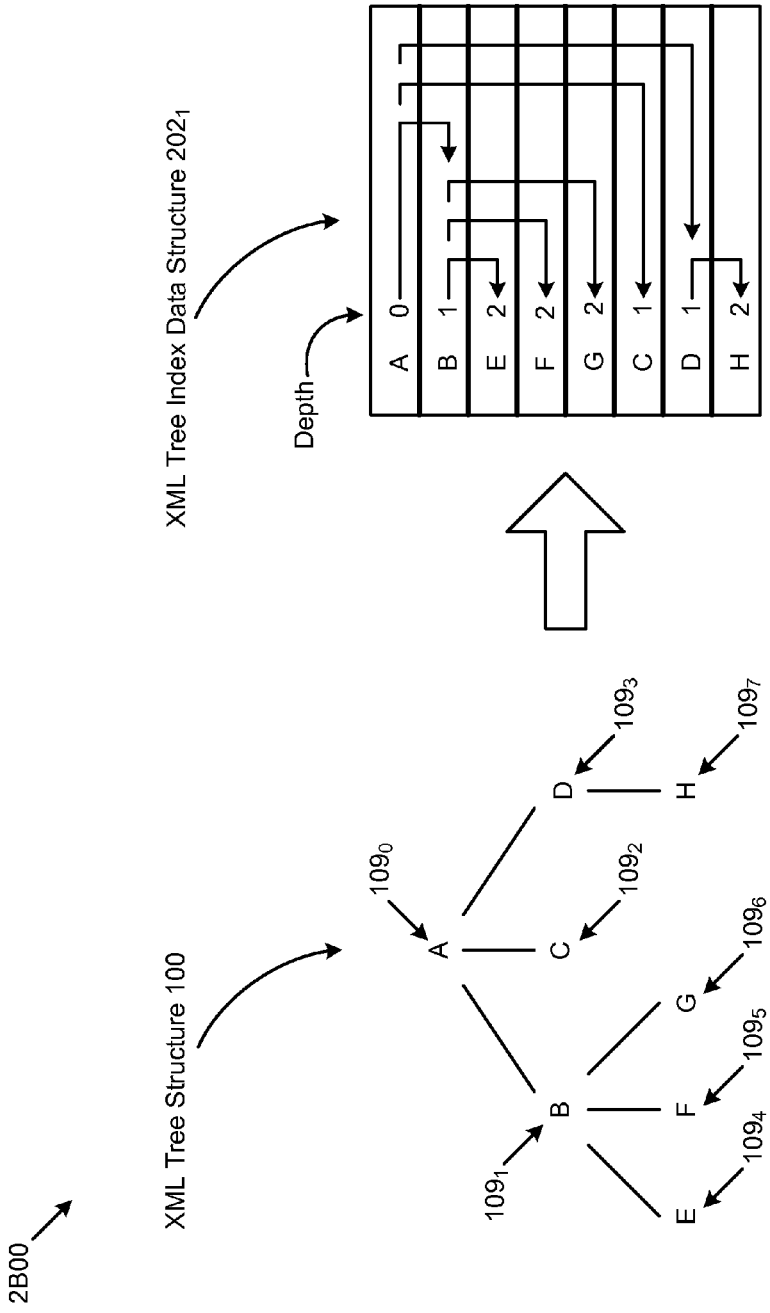
FIG. 2B depicts a transformation into an index for implementing a compact tree node representation of an XML document, according to some embodiments.

FIG. 2B depicts a transformation 2B00 into an index for implementing a compact tree node representation of an XML document. As an option, the present transformation 2B00 may be implemented in the context of the architecture and functionality of the embodiments described herein. Also, the transformation 2B00 or any aspect therein may be implemented in any desired environment.

As shown, an XML tree structure 100 is transformed into an index. The XML tree structure 100 comprises elements {A (node 109$_0$), B (node 109$_1$), C (node 109$_2$), D (node 109$_3$), E (node 109$_4$), F (node 109$_5$), G (node 109$_6$), and H (node 109$_7$)}. The transformation 2B00 results in an XML tree index data structure 202$_1$, which XML tree index data structure comprises an array of rows wherein each row holds a node identifier. For example, the node 109$_0$ can be held in a row having the node identifier "A". Of course, it is known in the art that an element node in a well-formed XML document can comprise a wide range of identifiers and still remain in accordance with the syntax of a well-formed XML document.

In addition to the node identifier, a row can comprise a pointer or other reference to a sibling node or a child node. In some cases, and as shown, a node (e.g., node "A") might have multiple children, and the row can comprise multiple pointers or other references to multiple child nodes.

In some cases, the XML tree index data structure $202_1$ is constructed by a depth-first traversal of the given instance of XML tree structure 100; however, it can also be constructed by a breadth-first traversal of the given instance of XML tree structure 100. The selection of a depth-first traversal or a breadth-first traversal can be made on the basis of the intended use model.

The relationships between nodes 109 serve to define the XML tree structure. In this embodiment, element nodes are the only nodes that have children. The children of an element are defined as its first child plus all other nodes that can be reached by transitive next-sibling relationships from that first child. Each element node has a name, sometimes referred to as a "tag name". In XML strings, the tag names enclose all strings generated from their child nodes. An example XML string for an element tag name is <tag123>child values go here</tag123>. An XML tree structure using XML strings can be constructed using known techniques.

Figure 2C:
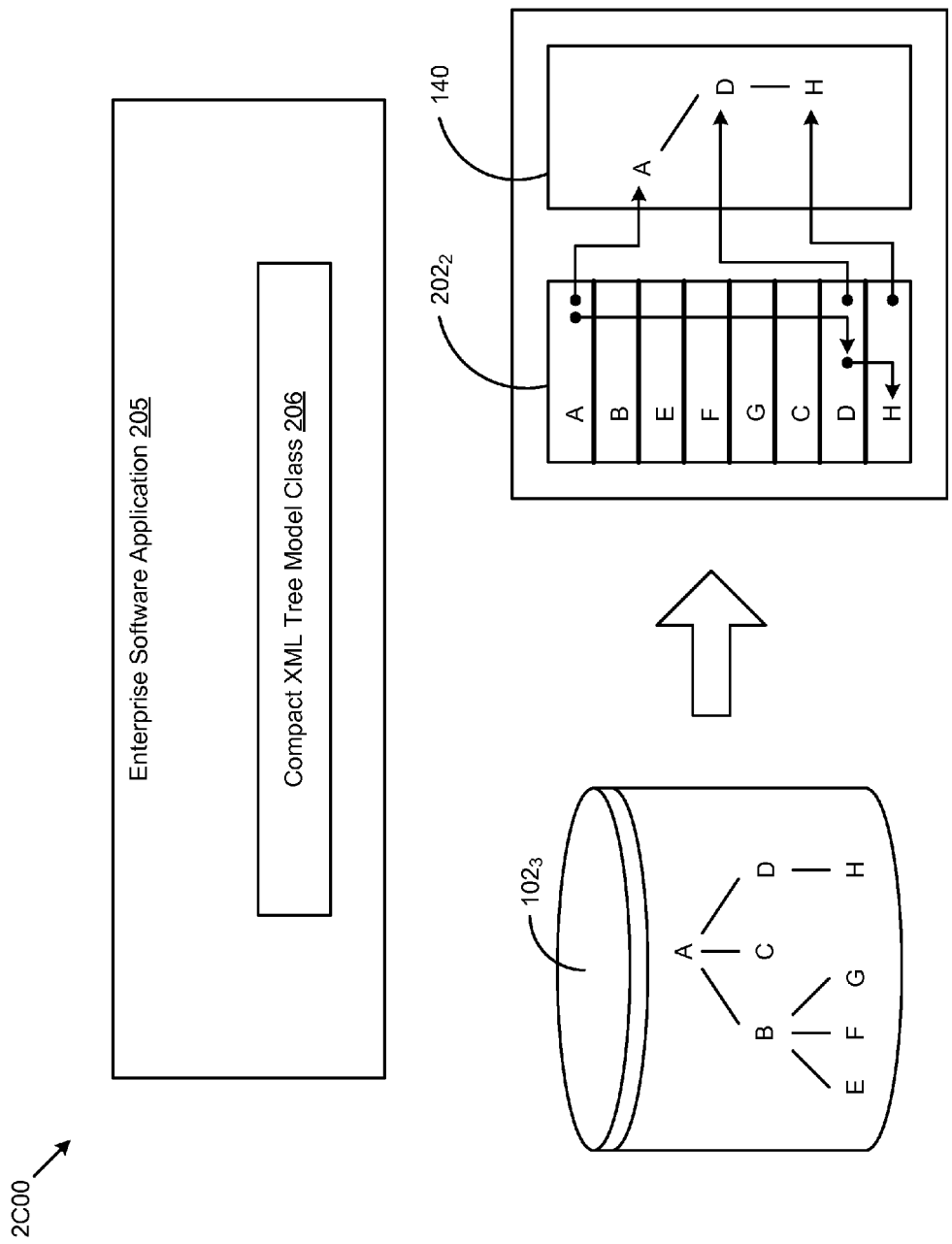
FIG. 2C depicts an enterprise software application in a system for implementing a compact tree node representation of an XML document, according to some embodiments.

FIG. 2C depicts an enterprise software application in a system 2C00 for implementing a compact tree node representation of an XML document. As an option, the present system 2C00 may be implemented in the context of the architecture and functionality of the embodiments described herein. Also, the system 2C00 or any aspect therein may be implemented in any desired environment.

As shown, the system 2C00 implements a computer method for creating a compact tree node representation of an XML document. The method can be implemented within an enterprise software application 205 using a compact XML tree model class 206. The compact XML tree model class 206 reads from the persistent storage device $102_3$ and produces the XML tree index data structure $202_2$ and a hash table 140. More specifically, the compact XML tree model class 206 begins by allocating a first portion of the memory to store an XML tree index data structure, then traversing the XML document from a first node (e.g., "A") to a final node (e.g., "H"), while processing the intermediate nodes (e.g., B, C, D, E, F, G). While processing the traversed nodes, the processing performs tests/checks and takes certain processing steps, as follows:

When the traversed node is an element node, then adding the element node to the XML tree index data structure $202_2$, then;
Copying the element node values (if any) to the hash table.

The XML tree index data structure $202_2$ can be implemented in an array, possibly a sparsely populated array, or it can be implemented using a linked list (or other convenient data structure). A given node can have children, and such a given node can point to its one or more child nodes via a pointer in the array (as shown).

Figure 3A:
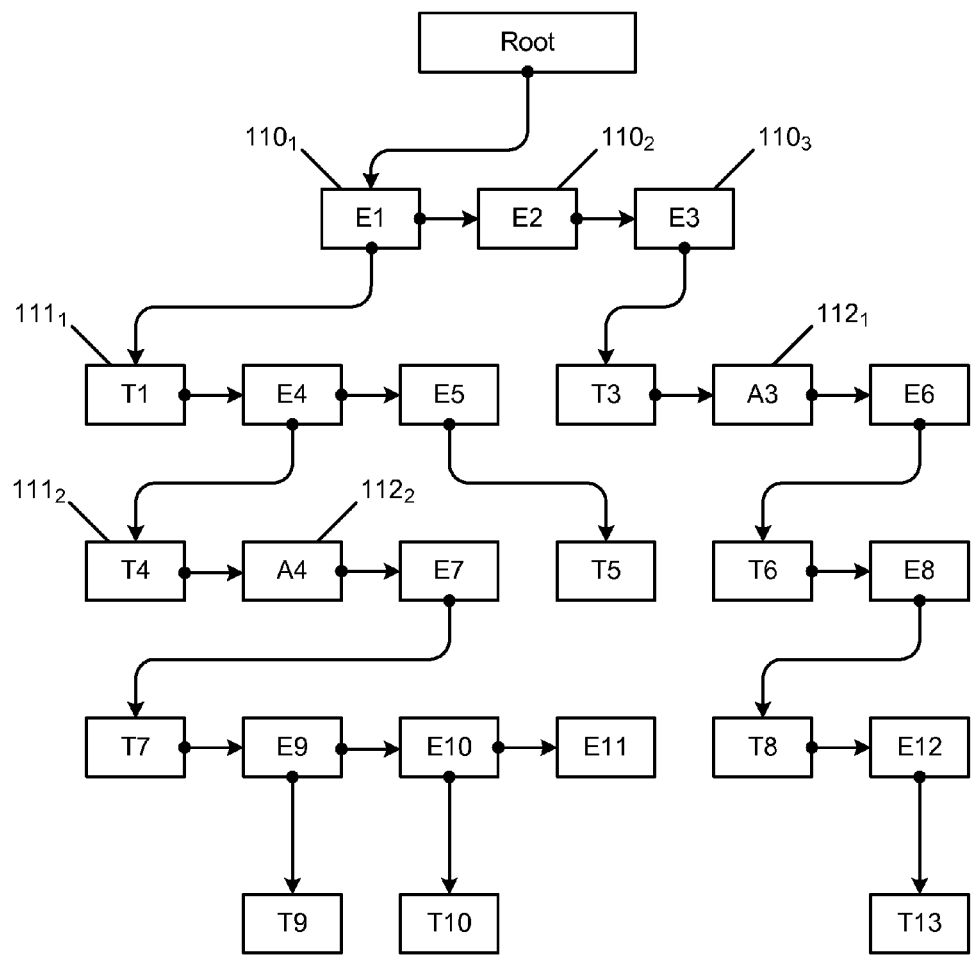
FIG. 3A is a diagram of a tree node representation of an XML document, according to some embodiments.

FIG. 3A is a diagram 3A00 of a tree node representation of an XML document. As an option, the present diagram 3A00 may be implemented in the context of the architecture and functionality of the embodiments described herein. Also, the diagram 3A00 or any aspect therein may be implemented in any desired environment.

The foregoing XML tree structures are merely illustrative for the purposes of the present disclosure, and more detailed and larger XML tree structures are reasonable and envisioned. For example, the depiction of FIG. 3A gives an XML tree structure having a larger number of element nodes 110 (e.g., element node $110_1$, element node $110_2$, element node $110_3$, etc.), as well as some text nodes 111 (e.g., text node $111_1$, text node $111_2$,), and some attribute nodes 112 (e.g., attribute node $112_1$, attribute node $112_2$, etc.).

Also shown are relationships between nodes, namely sibling relationships and child relationships. In this embodiment, each attribute node 112 is associated with an element and is stored as a child of that element. An element can have any number of attributes. An attribute consists of a name value and a text value. In XML strings, the attributes appear to the right of the element's tag name. For example, <tag123 atribute_name_1="attr_value_1" attr_name_2="attr_val_2"></tag123>.

The text nodes store the text values that are associated with an element. In XML strings, they are shown enclosed by open and close tags bearing the tag's name. For example, <tag123>text value from text node</tag123>. An element can have any number of text nodes; however, when represented as an XML string, all text nodes are concatenated into one text value for that element.

For all node types, the names and text values can be stored in a hash table. One of the attributes of using a hash table is that any duplicate name values and/or any duplicate text values can be stored only once in the hash table, and any duplicates encountered will not require additional memory for storing the duplicate encountered text values. All text values in the hash table can be retrieved using an index and an offset (see examples in FIG. 1A, FIG. 4A and FIG. 4B). The offset can be zero.

Figure 3B:
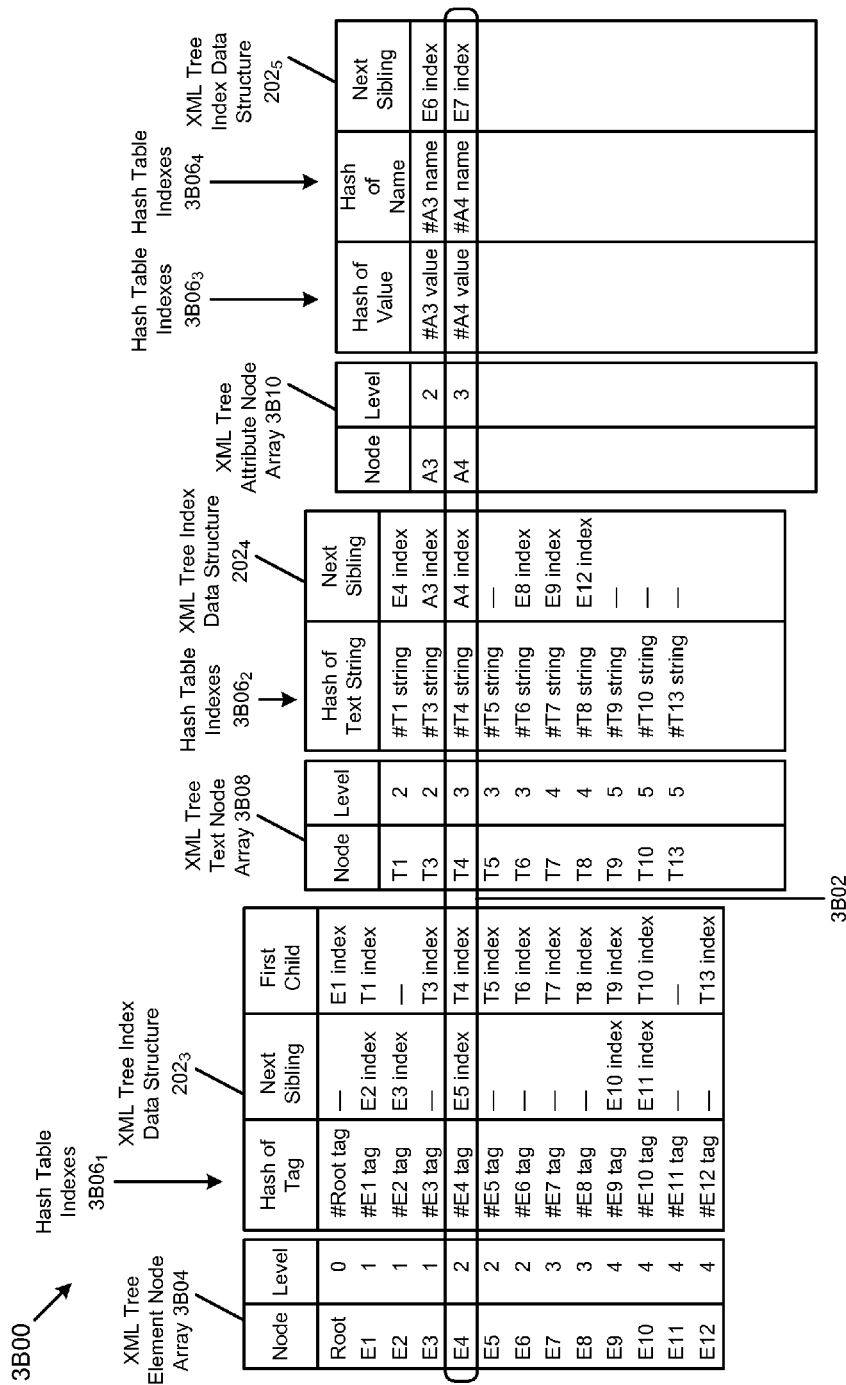
FIG. 3B shows various components of XML tree index structures for implementing compact tree node representation of an XML document, according to some embodiments.

FIG. 3B shows various components of XML tree index structures 3B00 for implementing compact tree node representation of an XML document. As an option, the present XML tree index structures 3B00 may be implemented in the context of the architecture and functionality of the embodiments described herein. Also, the XML tree index structures 3B00 or any aspect therein may be implemented in any desired environment.

FIG. 3B is a tabular representation of an XML tree index data structure 3B00. More particularly, the XML tree index data structure contains node identifiers in the tabular format of the XML tree element node array 3B04. As earlier indicated, names and values (e.g., node names and text node values) can be stored in hash tables, and the embodiment of the XML tree index data structure $202_3$ and XML tree index data structure $202_4$ are examples of such a storage regime. In one embodiment following this regime, a first part of the XML tree index data structure 3B00 stores only indexes, and the second part stores node names and indexes. This organization allows for a compact index (e.g., completely in-memory index) to represent an extremely large XML document.

As shown, the nodes in the XML tree are represented by an index value or hash value, which points to a location of a structure in one of the arrays. Each type of node in the XML tree can be organized in a structure applicable to the particular node type. Some such organizations of node representations are shown below, following the example of grouping 3B02:

Element node (e.g., "E4")
 Hash table index for element name (e.g., "#E4tag");
 XML tree index for next sibling (e.g., "E5index");
 XML tree index for first child (e.g., "T4index").
Text node (e.g., "T4")
 Text string (e.g., "#T4string");
 Next Sibling (e.g., "A4index").
Attribute node (e.g., "A4")
 Hash table index for attribute value (e.g., "A4value");
 Hash table index for attribute name (e.g., "A4name");
 Index of next sibling (e.g., "E7index").

Other data values can be stored in similar structures such as:
Hash table index for attribute value;
XML tree index for next sibling;
Hash table index for text string;
XML tree index for next sibling.

Now, following the organization in this embodiment, it can be seen that it is possible that only the XML tree element node array 3B04 and the corresponding XML tree index data structure (e.g., XML tree index data structure $202_3$) need be brought into the computer's main memory, and yet comprise a compact representation of every node in the entire XML tree. As shown, the XML tree index data structure $202_3$ comprises hash table indexes (e.g., hash table indexes $3B06_1$) so as to associate a given node (e.g., "E4") with a particular hash table index (e.g., "#E4tag"). The data of the nodes can be stored in memory blocks, and be retrieved on demand (e.g., by paging to/from disk storage).

The data of the nodes can be stored in an organization to support fast access to a given node. As shown, the data structure forming the XML tree text node array 3B08 is organized in conjunction with the XML tree index data structure $202_4$ so as to associate a given text node with its respective hash table index (e.g., see hash table indexes $3B06_2$), and the XML tree attribute node array 3B10 is organized so as to associate a given attribute node (e.g., "A4") with a hash table index (e.g., hash table index $3B06_3$) for the attribute value, and a hash table index (e.g., hash table index $3B06_4$) for the attribute name. Conveniently, a next sibling index is given in the XML tree index data structure $202_5$.

As shown, the root node has an index of "Root" (the root node is by convention the first node in the arrays). It follows that no XML node can include the root node as a sibling or as a child, thus the value zero can be used when a node does not have a next sibling. The index value zero can also be used for the first child of elements that do not have children.

The children of an element can be stored for linked access, which access starts with the "first child" node of the element, and then traverses through next sibling nodes until a node without a next sibling is reached. The attributes of an element are stored in its list of children. There can be a significance to the order of the attributes within the child-linked list, however sometimes the attributes have no significance from other elements or text nodes in the linked list. Also, there can be a significance to the order of the elements and text nodes within the child linked list, however sometimes the order of elements and text nodes have no significance, and can be interspersed in any order. Or, any order dependence of text nodes in the same child list can be maintained (e.g., by virtue of the order in which those text values concatenated in storage).

In this specific embodiment, the stored values can be represented as follows
A hash table index entry is represented in 32 bits, organized as:
16 bits for storing the offset of the text string within the hash bin;
16 bits for storing the index of the hash bin within the hash table.
An XML tree index entry is represented in 32 bits, organized as:
4 bits for storing the type of XML tree node (e.g., 0=element, 1=text node, 2=attribute, etc.);
12 bits for storing an index into an array of memory blocks of the corresponding node type;
16 bits for storing an index into an array of node structures in the memory block.

Still further, regarding this specific embodiment, the stored values can be represented as follows:
Each element node comprises of 12 bytes, 4 bytes each for:
Hash table index for element name (tag name);
XML tree index for next sibling;
XML tree index for first child.
Each attribute node consists of 12 bytes, 4 bytes each for:
Hash table index for attribute name;
Hash table index for attribute value;
XML tree index for next sibling.
Each text node consists of 8 bytes, 4 bytes each for:
Hash table index for text string;
XML tree index for next sibling.

As depicted, a node is represented compactly, using only hash table indexes and XML tree indexes, thus a representation of the entire XML tree, comprising all constituent nodes, can be compactly represented and brought into computer's main memory at one time.

FIG. 4A is a schematic 4A00 of a component of an XML tree index structure. As an option, the present schematic 4A00 may be implemented in the context of the architecture and functionality of the embodiments described herein. Also, the schematic 4A00 or any aspect therein may be implemented in any desired environment.

As indicated in the schematic 4A00, tree node arrays are implemented using memory blocks (e.g., MB1, MB2, etc.). This technique allows memory to be allocated on demand for each type of tree node. Further, the use of memory blocks allows the total array sizes to be increased on demand to the full extent required for representation of the XML tree structure 100, while the disclosed use of memory blocks as shown in the depicted XML tree index data structures (XML tree index data structure $202_5$, XML tree index data structure $202_6$, XML tree index data structure $202_7$, etc.) eliminates the need to allocate memory blocks that are allocated in consecutive memory locations.

As shown here, a given node can be represented in an array corresponding to its type (e.g., element node, text node, attribute node, etc.) and each node has its associated location within a memory block. Direct access to a node is accomplished using a memory block indicator (e.g., MB1, MB2, etc.) and array offset (e.g., E1offset, T1offset, etc.). Of course, the schematic 4A00 depicts merely one technique for indexing nodes using an associated memory block locator. As shown, the embodiment uses the corresponding memory block indicator in the memory block index column and the associated array offset given in the array offset column.

Following this hierarchical approach, the use of memory blocks allows the total array sizes to be increased on demand to the full extent required for representation of the XML tree structure 100, while the disclosed uses of memory blocks eliminates the need to allocate consecutive memory blocks.

FIG. 4B is an array-oriented schematic 4B00 of an XML tree index structure used in a compact tree node representation of an XML document. As an option, the present schematic 4B00 may be implemented in the context of the architecture and functionality of the embodiments described herein. Also, the schematic 4B00 or any aspect therein may be implemented in any desired environment.

Strictly as one embodiment of the shown XML tree index data structure $202_8$, the bit-wise sizes of stored data items can be:

Node index within an XML tree index=32 bits in bit fields as follows:
Type=4 bits
Example: 0=element node, 1=text node, 2=attribute node
Memory Block Index=12 bits
Array Offset=16 bits In this embodiment, the hash table consists of 65,536 hash bins. Given any fixed size of a hash table, it can happen that more than one text string is mapped (via its hash value) to the same hash bin. When more than one text string maps to the same bin, the strings can be delimited by a left arrow "<", which is a character that is not allowed within the XML names or text values. As an alternative, text strings can be converted to UTF8 (or otherwise formatted) strings before they are added to the hash table. In order to address more than one string in a hash bin, an offset number is used to indicate which string within that hash bin is to be addressed. Within each hash table bin string, it is possible that individual text strings can be located and enumerated by counting offsets, or by counting the number of "<" characters from the beginning of the string. New text values can be added by appending them to the end of their hash bin string, and adding a terminating delimiter, and using the corresponding array offset.

Figure 5:
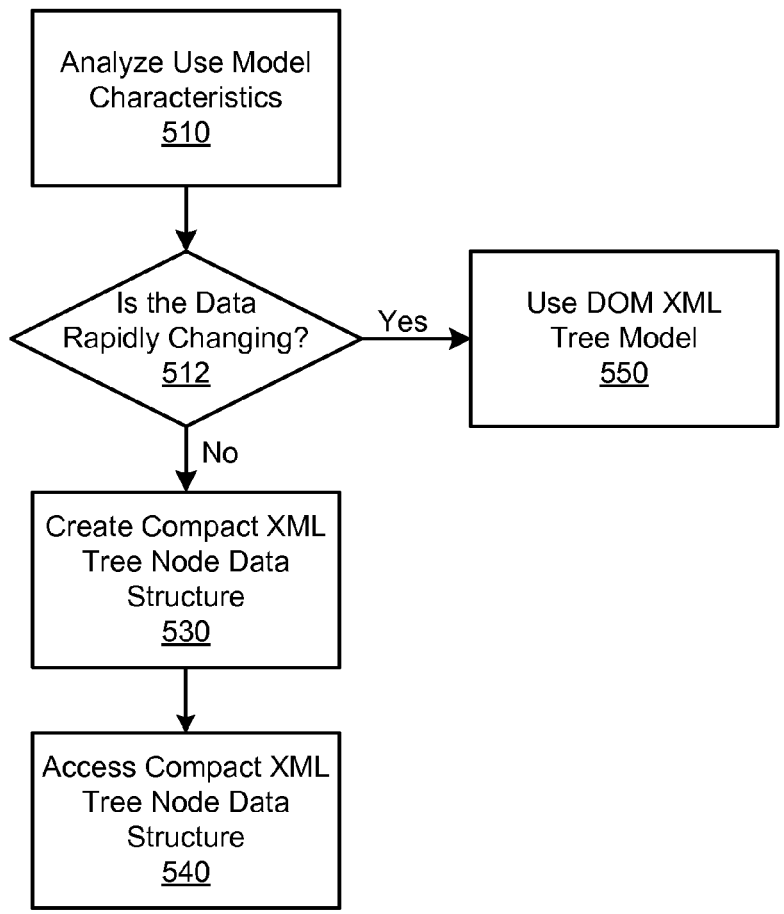
FIG. 5 is a flowchart for using a system having a compact tree node representation of an XML document, according to some embodiments.

FIG. 5 is a flowchart 500 for using a system having a compact tree node representation of an XML document. As an option, the present flowchart 500 may be implemented in the context of the architecture and functionality of the embodiments described herein. Also, the flowchart 500 or any aspect therein may be implemented in any desired environment.

Exemplary uses for embodiments of this disclosure include storing XML data, where that data has been generated (e.g., by a report generator) and the generated structures are used and reused. Another exemplary use would be when the XML text data never changes, or rarely changes. The compact XML tree node data structure can be easily changed by changing the index values in the node arrays. The compact XML tree node data structure is designed for storing very large XML structures using minimal memory space.

Accordingly, a system might follow the flow of FIG. 5 in order to determine when to implement a compact XML tree node data structure, or when to use other techniques (e.g., such as DOM). As shown, a system that implements operations of the flowchart 500 commences by analyzing characteristics of a use model (see operation 510), and on the basis of that determination, especially after determining if the XML data is rapidly changing or not (see decision 512), the system will move to use the DOM model (see operation 550) or, otherwise, to use techniques as disclosed herein, namely to create a compact XML tree node data structure (see operation 530) and access that compact XML tree node data structure 170 using the heretofore disclosed data structures (see operation 540).

Many computer systems can implement the disclosed methods for creating a compact tree node representation of an XML document. For example, for creating instances of the XML tree index structures 3B00, the method can commence upon allocating a first portion of memory to store a first memory block for storing an XML tree index data structure, and then allocating a second portion of the memory to store the hash table. Then, an XML document (e.g., an XML tree structure 100) can be transformed into an XML tree index data structure by traversing the XML document from a first node to a final node while processing the nodes (including any intermediate nodes) as follows:

When the traversed node is an element node, then adding the element node to the XML tree index data structure (possibly also placing the element node name in the hash table);

When the traversed node is a text node, then populating a text node index into the XML tree index data structure and copying the text node values to the hash table;

When the traversed node is an attribute node, then populating an attribute node index into the XML tree index data structure and copying the attribute node values to the hash table;

Determining when the first memory block is fully populated (e.g., or is known or calculated to overflow upon an attempted copy-in of a node), then storing the first memory block to the persistent storage device and then allocating a next portion of memory.

The foregoing techniques serve to create and store large trees, yet access to the resulting trees can be done with only needed portions resident in the computer's main memory.

Still other improvements are possible. For example, it is possible to determine when the intermediate node is a text node that has already been copied to the hash table, and then not copying the text node values to the hash table, but instead merely using the hash value that points to the same text node. This avoids unnecessary duplication of text nodes.

It is also convenient to determine when a hashed text node to be inserted has the same hash bin as a previously hashed text node, and then storing the text node at an offset from the same hash bin. This allows for hash table collisions, yet handles such a collision gracefully.

Of course, the data of a text node might be conveniently stored using a particular text encoding scheme. For example, some embodiments convert the data of a text node into UTF8 strings.

Dividing the XML document into an index portion and a hash table portion supports effective use of memory by paging-in the node data only as needed (and paging-out when the node data is no longer needed). In a computer implemented embodiment, one method for reading a compact tree node representation of an XML document comprises reading an entire XML tree index data structure into a memory, and then processing the XML tree index data structure, by accessing the node data only when needed. In some embodiments, the processing includes determining when the node is a text node, then paging into memory a text node value from a hash table. Similarly, determining when the node is an attribute node, then paging into the memory an attribute node value from a hash table, and so on.

Other Features

Modifying relationships within the compact XML tree node data structure 170 is fast since the relationships are implemented using indexes and hash codes. In exemplary uses, such a structure is much faster as compared to DOM where the relationships involve C++ classes and data pointers.

Another aspect of the compact XML tree node data structure 170 is that certain types of editing can be expressly enabled, in some embodiments. Certain editing conveniences arise from the reuse of the text values in the hash table. Since many text usages may point to a single text string in the hash table, a particular use of a text value can be easily created by adding it as a new value that is pointed to by the particular use.

Editing the tree structure can be accomplished by merely changing the index values. However, editing the text values can be accomplished using a technique to add a new entry into the text hash table. The nodes that should remain pointing to the unedited text nodes remain unaltered in the hash table. It is also possible that an edited text value (e.g., one that is added as a new entry into the text hash table) replaces the last/only reference to the unedited text value, thus it follows that there can be some unused values in the hash table. Accordingly, some embodiments, step though the hash table to identify unused text values, and possibly compact the storage areas used for storing the identified unused text values.

ADDITIONAL EMBODIMENTS OF THE DISCLOSURE

Figure 6:
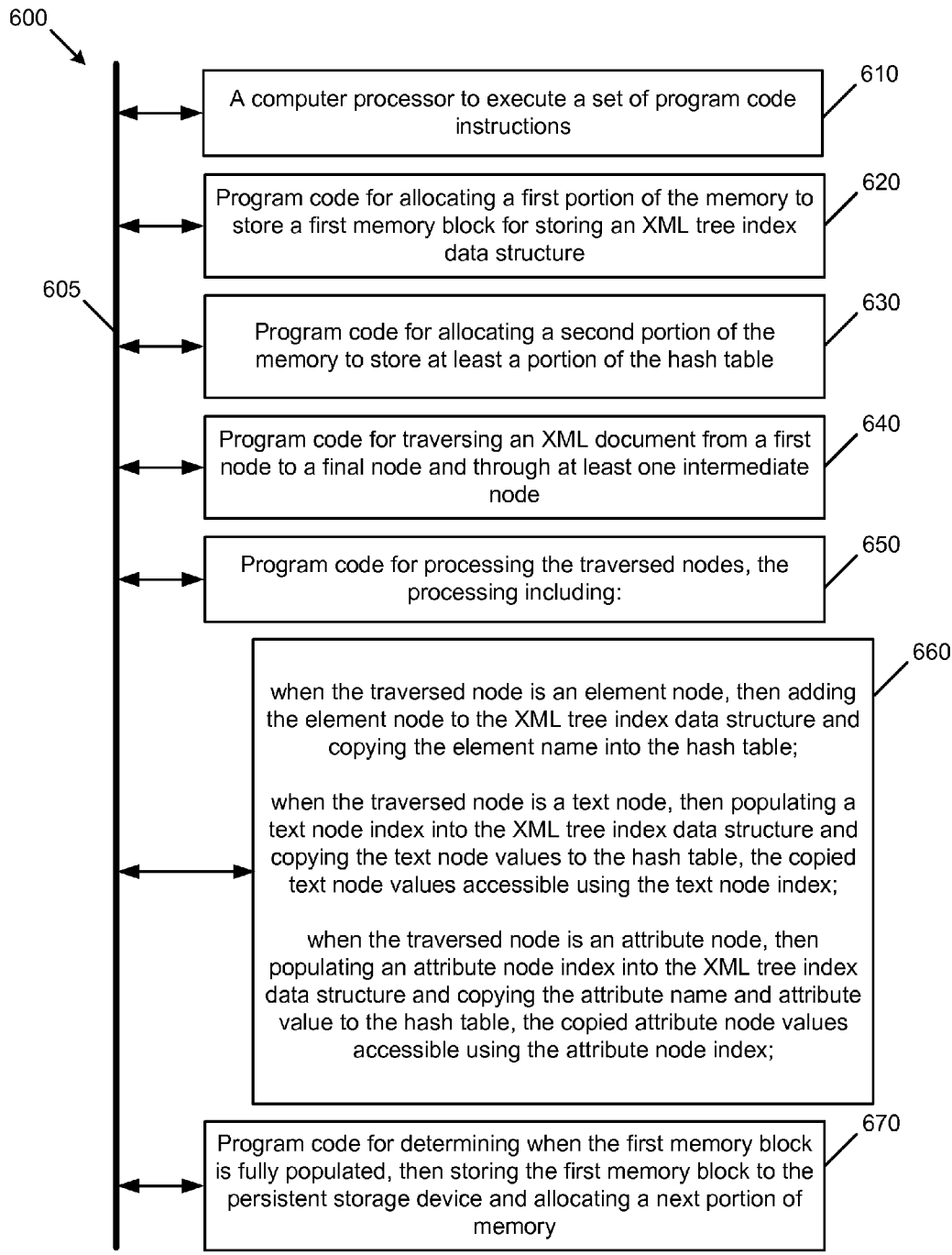
FIG. 6 depicts a block diagram of a system to perform certain functions of a computer system, according to some embodiments.

FIG. 6 depicts a block diagram of a system to perform certain functions of a computer system. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: allocating a first portion of the memory to store a first memory block for storing an XML tree index data structure (see module 620); allocating a second portion of the memory to store at least a portion of the hash table (see module 630); traversing an XML document from a first node to a final node and through at least one intermediate node (see module 640); processing the traversed nodes, the processing comprising conditional operations (see module 650); performing such conditional operations such as, when the traversed node is an element node, then adding the element node to the XML tree index data structure; when the traversed node is a text node, then populating a text node index into the XML tree index data structure and copying the text node values to the hash table, the copied text node values accessible using the text node index; and when the traversed node is an attribute node, then populating an attribute node index into the XML tree index data structure and copying the attribute node values to the hash table, the copied attribute node values accessible using the attribute node index (see module 660); and determining when the first memory block is fully populated, then storing the first memory block to the persistent storage device and allocating a next portion of memory (see module 670).

System Architecture Overview

Figure 7:
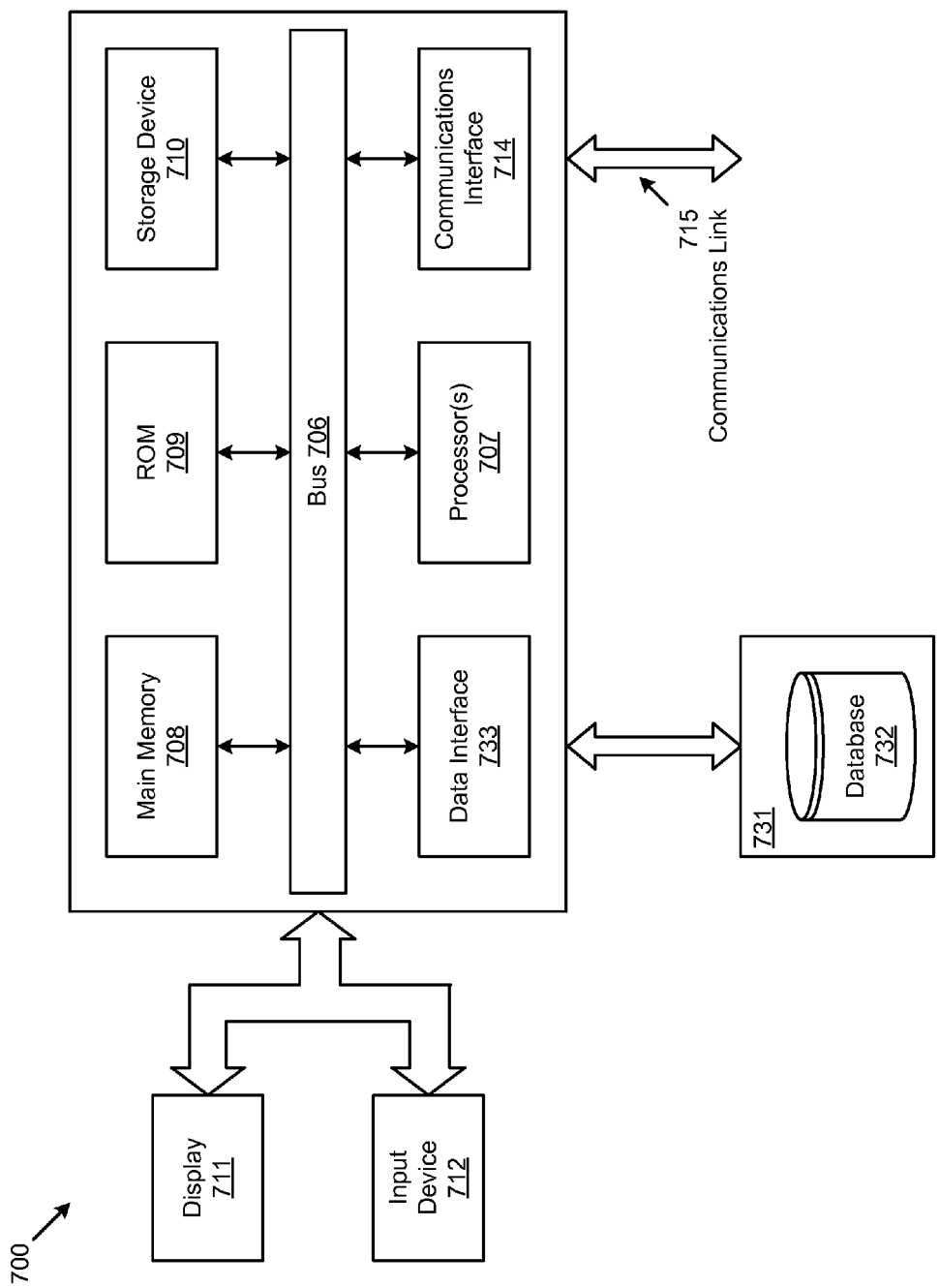
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to other embodiments of the disclosure, two or more computer systems 700 coupled by a communication link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communication link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for creating a compact tree node representation of an extensible markup language (XML) document, the method comprising:
   creating a compact tree node representation of an extensible markup language (XML) document by:
   allocating a first portion of memory of a main memory of a computer to store a first memory block for storing an in-memory instance of an XML tree index data structure for the XML document, the in-memory instance of the XML tree index data structure comprising an array of rows in which each row holds a node identifier, one or more pointers referencing to one or more children nodes,
   allocating a second portion of the memory of the main memory of the computer to store one or more separate data structures for storing at least a portion of the node data for the XML document, the one or more separate data structures each storing a different type of node data;
   traversing the XML document from a first node to a final node and through at least one intermediate node; and
   processing traversed nodes of the XML document, the processing comprising:
   in determining a traversed node is an element node, adding the element node to the first portion of the main memory and copying an element name of the element node into the one or more separate data structures for storing at least a portion of the node data;
   in determining the traversed node is a text node, populating a text node index into the first portion of the main memory and copying text node values into the one or more separate data structures for storing at least a portion of the node data, the text node values copied being accessible via the text node index;
   in determining the traversed node is an attribute node, populating an attribute node index into the first portion of the main memory and copying an attribute name and attribute value into the one or more separate data structures, the attribute value copied being accessible via the attribute node index.

2. The method of claim 1, further comprising determining when the first memory block is fully populated, then storing the first memory block to a persistent storage device and allocating a next portion of memory.

3. The method of claim 1, wherein the different type of node data is selected from a group consisting of an element node, a text node, and an attribute node.

4. The method of claim 1, wherein the one or more separate data structures are hash tables.

5. The method of claim 1, wherein the first portion of the memory stores only indexes, and the second portion of the memory stores node names.

6. The method of claim 1, wherein the final node is a leaf node of the XML document.

7. The method of claim 1, wherein the intermediate node is a leaf node of the XML document.

8. The method of claim 1, further comprising:
   assigning one or more noncontiguous memory blocks to store the node data in the allocated second portion of the memory, the node data stored in one or more hash tables;
   representing a first node type with a first structure on the XML tree index structure, and representing a second node type with a second structure on the XML tree index structure, the first structure being different from the second structure;
   allocating a first memory block to store the node data associated with the first node type, and a second memory block to store the node data associated with the second node type;
   determining when the first memory block is fully populated, then storing the first memory block to a persistent storage device and allocating a next portion of memory, the first portion of the memory storing only indexes, and the second portion of the memory storing content of the nodes;
   determining whether XML data is rapidly changing, wherein creation of the compact tree node representation is performed based at least in part on the determination of whether the XML data is rapidly changing; and
   determining when a hashed text node to be inserted into the one or more separate data structures has a same hash bin as a previously hashed text node, then storing the hashed text node at an offset from the same has bin.

9. A computer system for creating a compact tree node representation of an extensible markup language (XML) document, comprising:
   a computer processor to execute a set of program code instructions; and a memory to hold the program code instructions, in which the program code instructions comprises program code to perform,
   creating a compact tree node representation of an extensible markup language (XML) document by:
   allocating a first portion of memory of a main memory of a computer to store a first memory block for storing an in-memory instance of an XML tree index data structure for the XML document, the in-memory instance of the XML tree index data structure comprising an array of rows in which each row holds a node identifier, one or more pointers referencing to one or more children nodes, and not comprising node data, wherein the node data are contents of the XML document corresponding to respective nodes;
   allocating a second portion of the memory of the main memory of the computer to store one or more separate data structures for storing at least a portion of the node data for the XML document, the one or more separate data structures each storing a different type of node data;
   traversing the XML document from a first node to a final node and through at least one intermediate node; and
   processing traversed nodes of the XML document, the processing comprising:
   in determining a traversed node is an element node, adding the element node to the first portion of the main memory and copying an element name of the element node into the one or more separate data structures for storing at least a portion of the node data;
   in determining the traversed node is a text node, populating a text node index into the first portion of the main memory and copying text node values into the one or more separate data structures for storing at least a portion of the node data, the text node values copied being accessible via the text node index;
   in determining the traversed node is an attribute node, populating an attribute node index into the first portion of the main memory and copying an attribute name and attribute value into the one or more separate data structures, the attribute value copied being accessible via the attribute node index.

10. The computer system of claim 9, further comprising determining when the first memory block is fully populated, then storing the first memory block to a persistent storage device and allocating a next portion of memory.

11. The computer system of claim 9, wherein the different type of node data is selected from a group consisting of an element node, a text node, and an attribute node.

12. The computer system of claim 9, wherein the one or more separate data structures are hash tables.

13. The computer system of claim 9, wherein the first portion of the memory stores only indexes, and the second portion of the memory stores node names.

14. The computer system of claim 9, wherein the final node is a leaf node of the XML document.

15. A computer program product embodied in a non-transitory computer readable medium, the computer readable medium having stored thereon a sequence of instructions which, when executed by a processor causes the processor to execute a process to create a compact tree node representation of an extensible markup language (XML) document, the process comprising:

creating a compact tree node representation of an extensible markup language (XML) document by:
allocating a first portion of memory of a main memory of a computer to store a first memory block for storing an in-memory instance of an XML tree index data structure for the XML document, the in-memory instance of the XML tree index data structure comprising an array of rows in which each row holds a node identifier, one or more pointers referencing to one or more children nodes, and not comprising node data, wherein the node data are contents of the XML document corresponding to respective nodes;
allocating a second portion of the memory of the main memory of the computer to store one or more separate data structures for storing at least a portion of the node data for the XML document, the one or more separate data structures each storing a different type of node data;

traversing the XML document from a first node to a final node and through at least one intermediate node; and
processing traversed nodes of the XML document, the processing comprising:
in determining a traversed node is an element node, adding the element node to the first portion of the main memory and copying an element name of the element node into the one or more separate data structures for storing at least a portion of the node data;
in determining the traversed node is a text node, populating a text node index into the first portion of the main memory and copying text node values into the one or more separate data structures for storing at least a portion of the node data, the text node values copied being accessible via the text node index;
in determining the traversed node is an attribute node, populating an attribute node index into the first portion of the main memory and copying an attribute name and attribute value into the one or more separate data structures, the attribute value copied being accessible via the attribute node index.

16. The computer program product of claim 15, further comprising determining when the intermediate node is a text node that has already been copied to the node data, and then not copying the text node to the node data.

17. The computer program product of claim 15, wherein the different type of node data is selected from a group consisting of an element node, a text node, and an attribute node.

18. The computer program product of claim 15, wherein the one or more separate data structures are hash tables.

19. The computer program product of claim 15, wherein the first portion of the memory stores only indexes, and the second portion of the memory stores node names.

20. The computer program product of claim 15, wherein the final node is a leaf node of the XML document.

21. The computer program product of claim 15, wherein the intermediate node is a leaf node of the XML document.

* * * * *

UNITED STATES PATENT AND TRADEMARK OFFICE
CERTIFICATE OF CORRECTION

PATENT NO. : 10,061,862 B2
APPLICATION NO. : 13/459901
DATED : August 28, 2018
INVENTOR(S) : Pogmore Page 1 of 1

It is certified that error appears in the above-identified patent and that said Letters Patent is hereby corrected as shown below:

In the Specification

In Column 4, Line 35, delete "141P," and insert -- $141_P$, --, therefor.

In Column 8, Line 10, delete "atribute" and insert -- attribute --, therefor.

In Column 14, Line 44, delete "PTSN," and insert -- PSTN, --, therefor.

Signed and Sealed this
Ninth Day of July, 2019

Andrei Iancu
*Director of the United States Patent and Trademark Office*